(12) United States Patent
Katoh et al.

(10) Patent No.: US 11,964,534 B2
(45) Date of Patent: Apr. 23, 2024

(54) CONTROL APPARATUS FOR VEHICLE, CONTROL METHOD FOR, AND CONTROL SYSTEM FOR VEHICLE

(71) Applicants: TOYOTA JIDOSHA KABUSHIKI KAISHA, Toyota (JP); DENSO CORPORATION, Kariya (JP)

(72) Inventors: Tatsunori Katoh, Nagoya (JP); Takaaki Inokuchi, Nagoya (JP); Hiroyasu Hadano, Toyota (JP); Asuka Marumo, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 495 days.

(21) Appl. No.: 17/320,985

(22) Filed: May 14, 2021

(65) Prior Publication Data

US 2021/0354525 A1 Nov. 18, 2021

(30) Foreign Application Priority Data

May 18, 2020 (JP) .................................. 2020-086458

(51) Int. Cl.
*B60H 1/00* (2006.01)
*B60W 50/12* (2012.01)
*G07C 9/00* (2020.01)

(52) U.S. Cl.
CPC ......... *B60H 1/00021* (2013.01); *B60W 50/12* (2013.01); *G07C 9/00309* (2013.01); *B60H 2001/00114* (2013.01); *G07C 2009/00365* (2013.01)

(58) Field of Classification Search
CPC ............ B60H 1/00021; B60H 1/00642; B60H 1/00657; B60H 1/3205; B60W 50/12
See application file for complete search history.

(56) References Cited

U.S. PATENT DOCUMENTS 9,156,437 B2 * 10/2015 Kim ...................... B60R 25/209
2011/0202201 A1    8/2011 Matsubara

FOREIGN PATENT DOCUMENTS

| CN | 102161335 A |   | 8/2011 |            |
|----|-------------|---|--------|------------|
| JP | 10-53109 A  |   | 2/1998 |            |
| JP | 2006-248471 A |   | 9/2006 |          |
| JP | 2008-87734 A |   | 4/2008 |           |
| JP | 2009255836 A | * | 11/2009 | ............. B60R 25/04 |
| JP | 2011-163295 A |   | 8/2011 |          |
| JP | 2013-237388 A |   | 11/2013 |         |

* cited by examiner

*Primary Examiner* — Joseph F Trpisovsky
(74) *Attorney, Agent, or Firm* — Sughrue Mion, PLLC

(57) ABSTRACT

A control apparatus for a vehicle disclosed herein is applied to a vehicle configured to perform pre-air conditioning of the interior of the vehicle by starting an internal combustion engine according to a remote control signal sent from a remote controller. When starting pre-air conditioning according to the remote control signal, the control apparatus sets the control mode of the vehicle to a drive-disabling mode, which is a control mode that disables an operation for driving the vehicle. If a specific mode-cancelling operation is detected in a situation in which the remote controller is present in the interior of the vehicle while the control mode of the vehicle is being set to the drive-disabling mode, the control apparatus cancels the drive-disabling mode while leaving the internal combustion engine operating.

20 Claims, 6 Drawing Sheets

[Fig. 1]
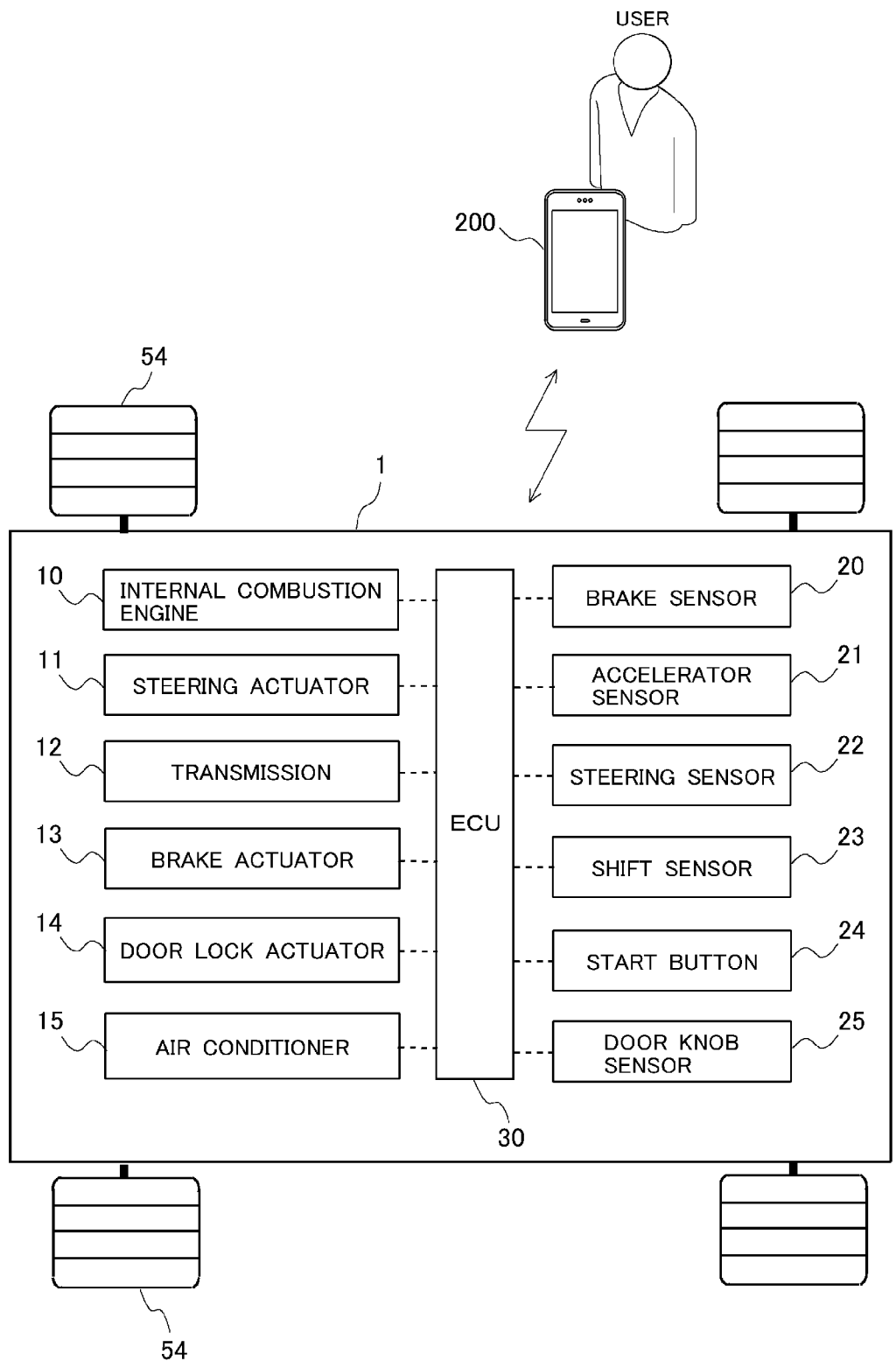

[Fig. 2]
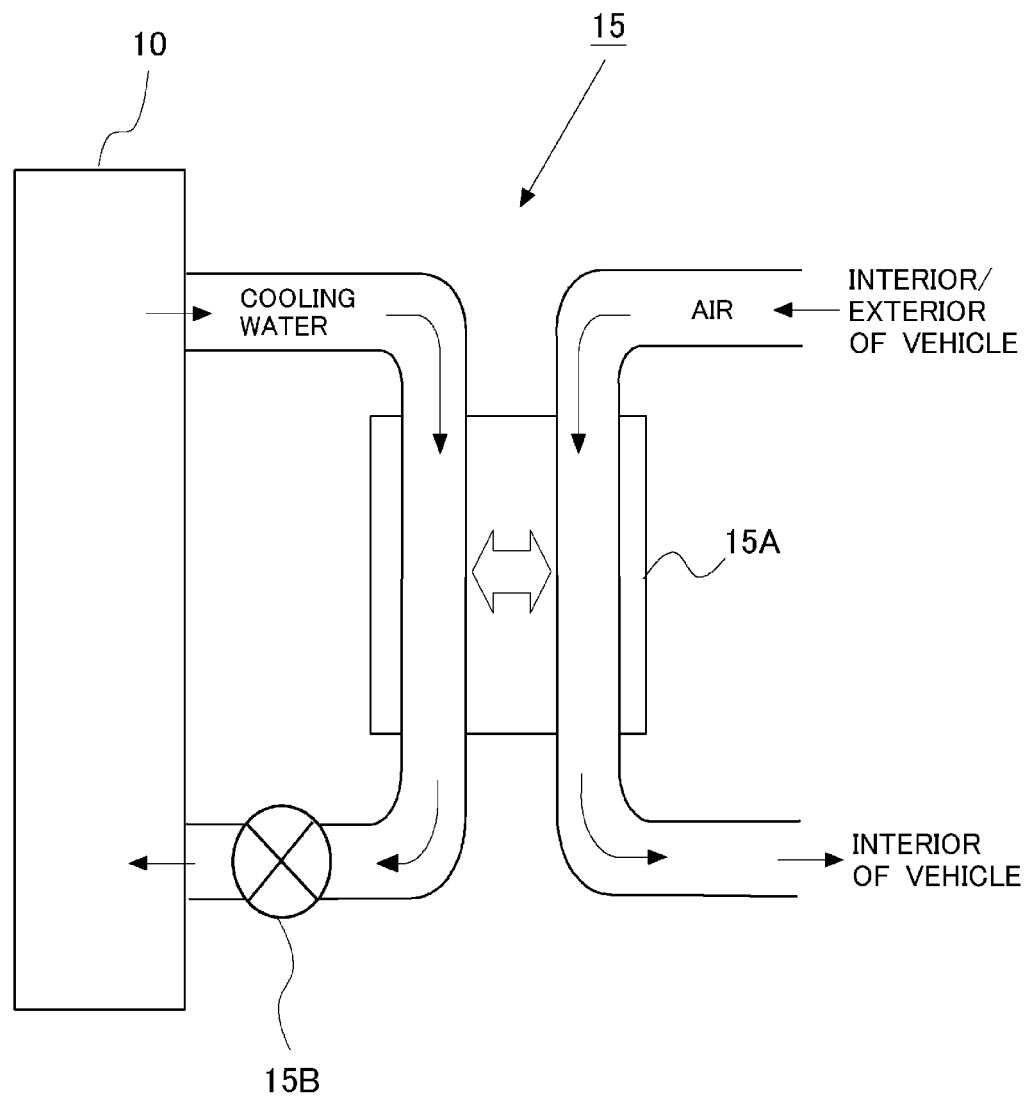

[Fig. 3]
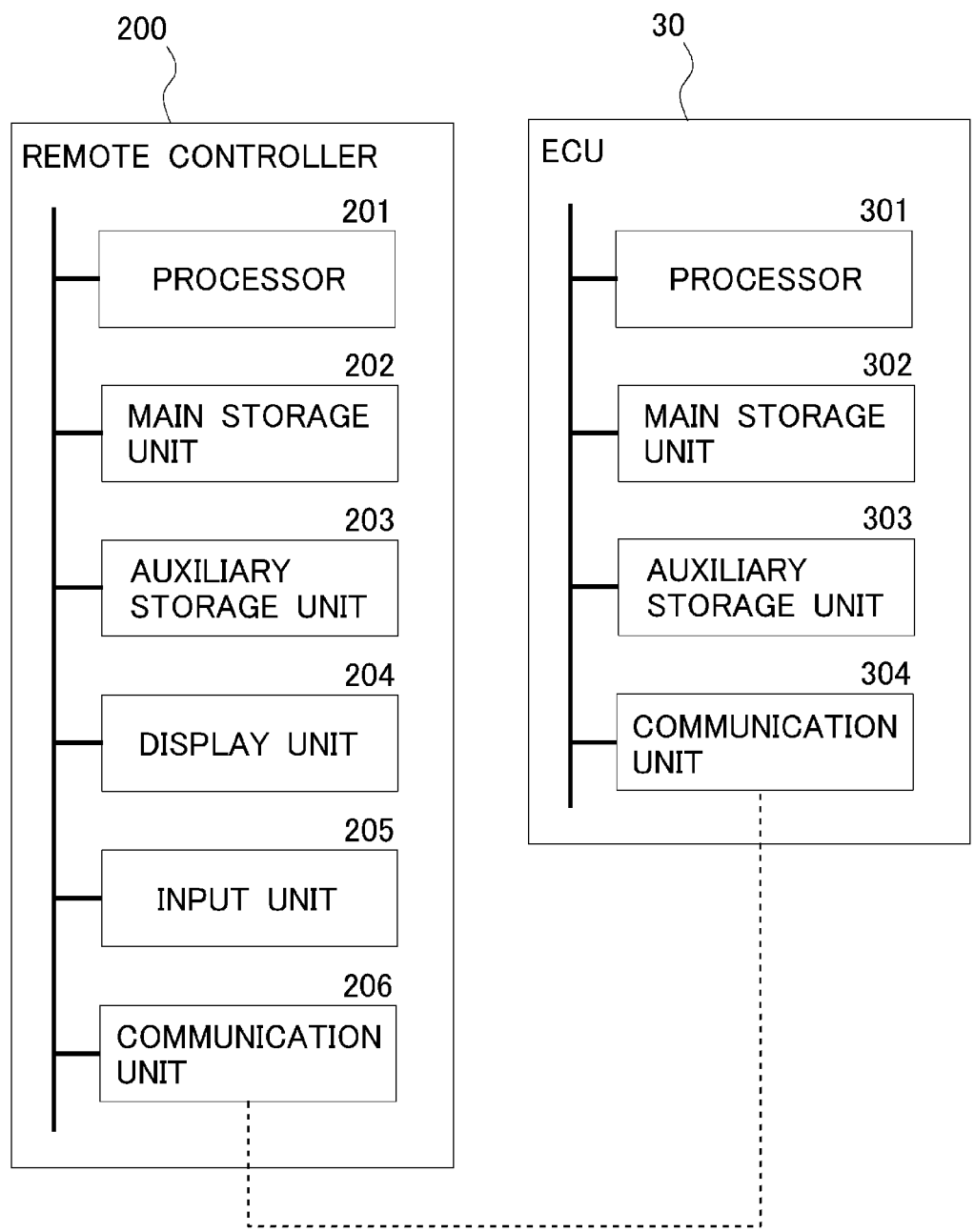

[Fig. 4]
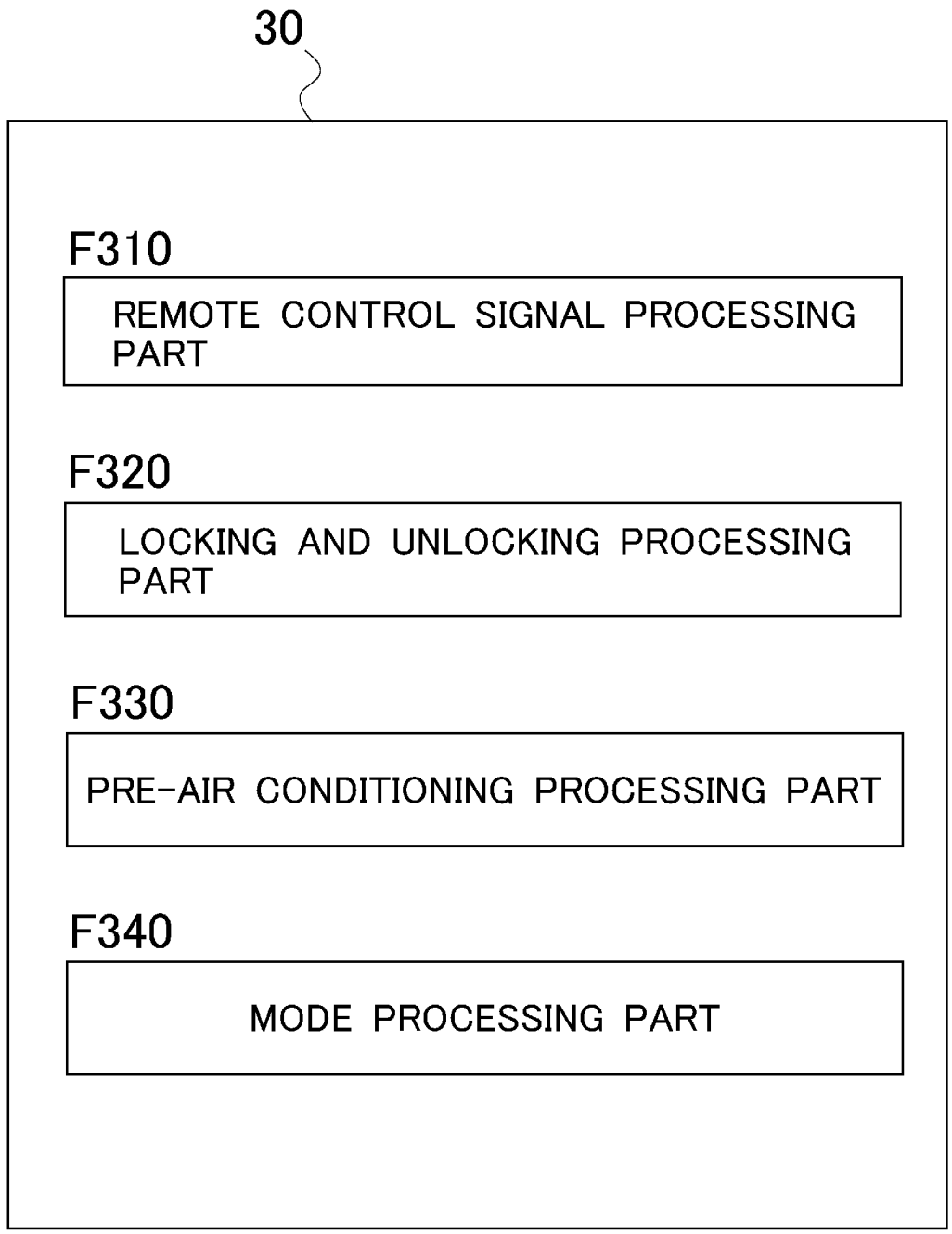

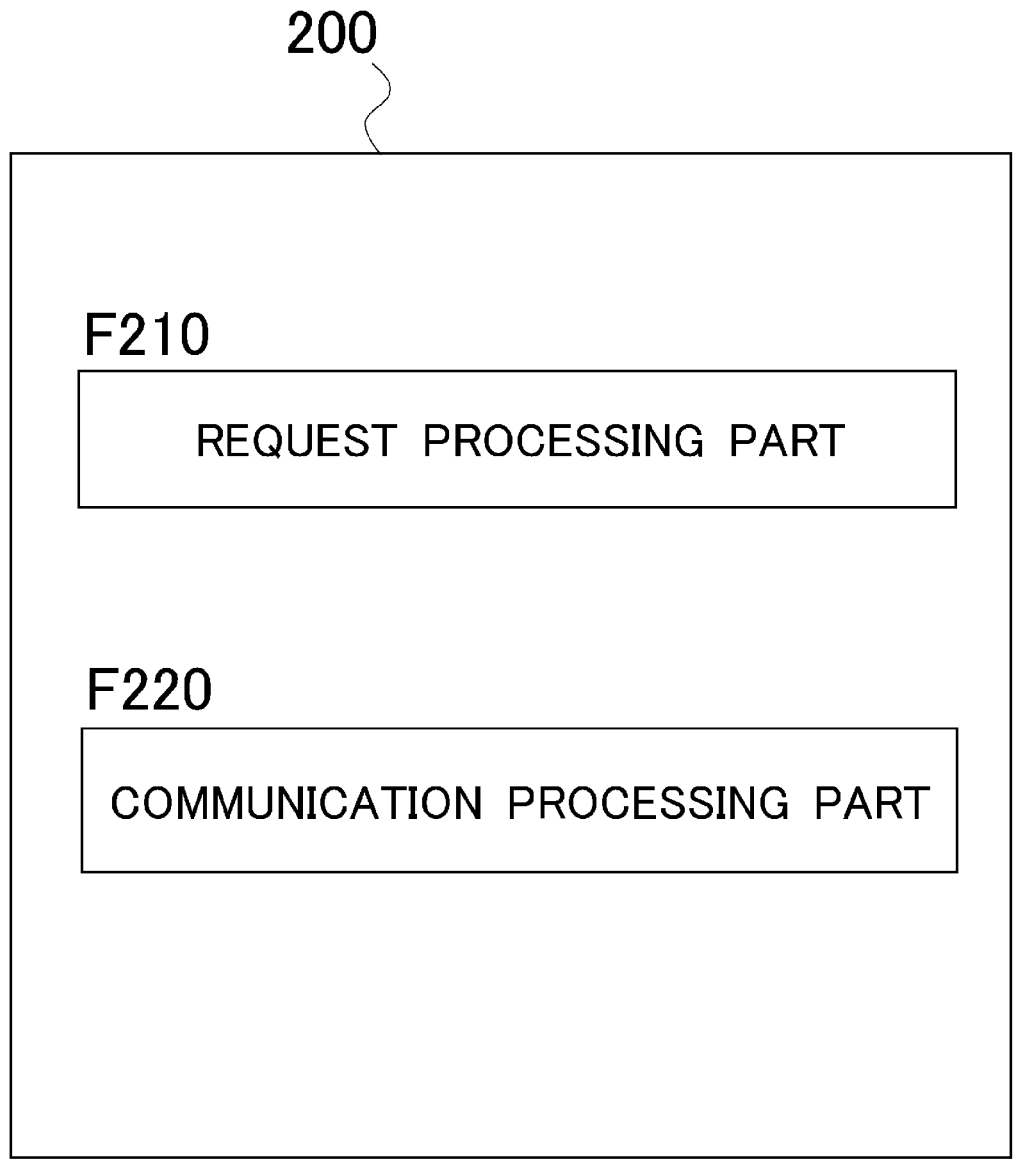
[Fig. 5]

[Fig. 6]
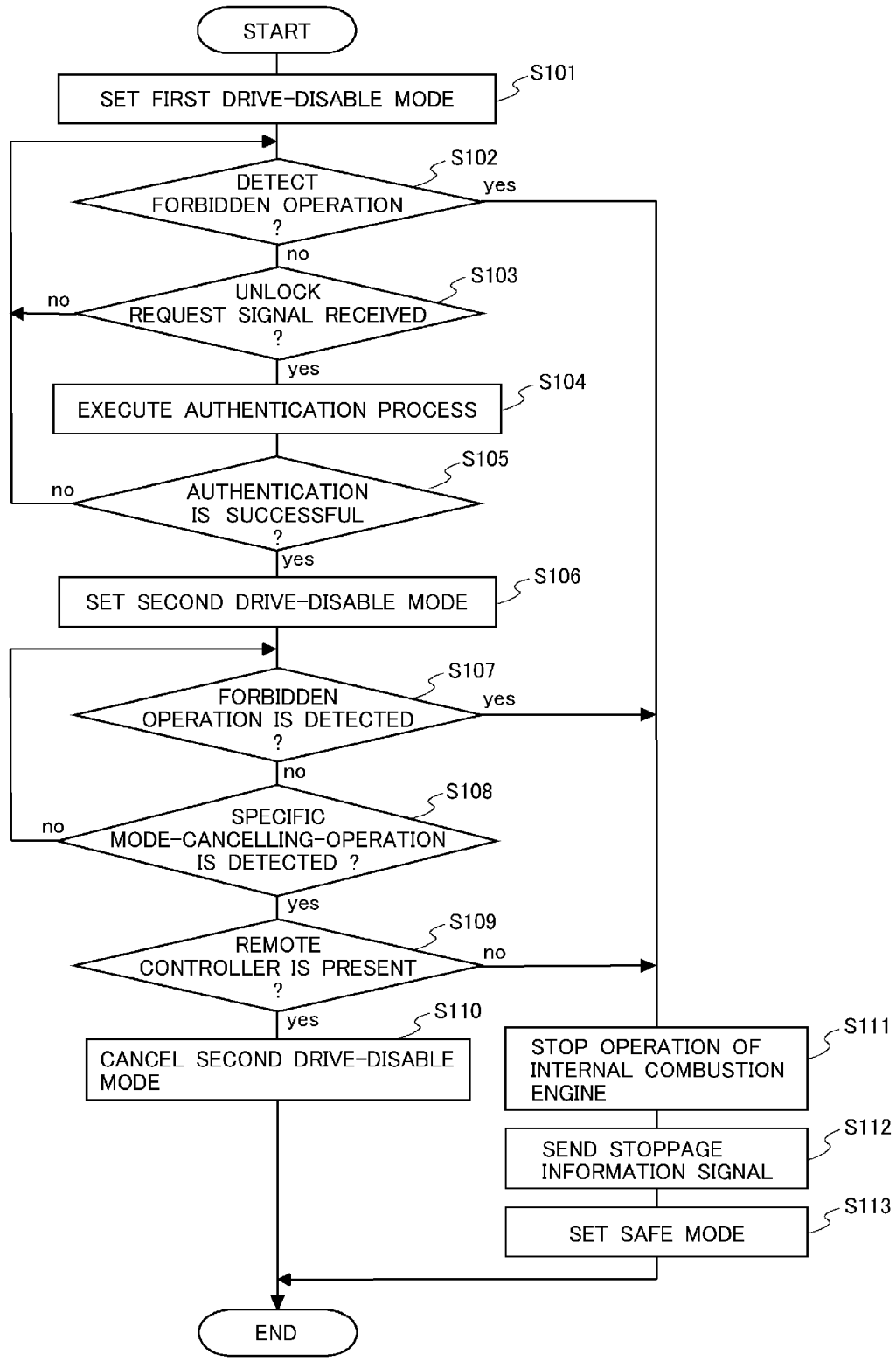

CONTROL APPARATUS FOR VEHICLE, CONTROL METHOD FOR, AND CONTROL SYSTEM FOR VEHICLE

CROSS-REFERENCE TO RELATED APPLICATIONS

This application claims the benefit of Japanese Patent Application No. 2020-086458, filed on May 18, 2020, which is hereby incorporated by reference herein in its entirety.

BACKGROUND

Technical Field

The present disclosure relates to a technology for controlling a vehicle.

Description of the Related Art

There are known control apparatuses that control a vehicle to start and stop the internal combustion engine and lock and unlock the doors in response to remote control signals sent from a remote controller. A control apparatus according to a prior art is configured in such a way as to stop the internal combustion engine simultaneously with unlocking the doors, if the internal combustion engine is operating at the time when it receives a signal for unlocking the doors from a remote controller (see, for example, Patent Literature 1 in the citation list below).

CITATION LIST

Patent Literature

Patent Literature 1: Japanese Patent Application Laid-Open No. 10-053109

SUMMARY

The technology disclosed herein relates to vehicles configured to perform pre-air conditioning by operating the internal combustion engine by remote control, and its object is to strike good balance between convenience of the users and security of the vehicles.

Disclosed herein is a control apparatus applied to a vehicle configured to perform pre-air conditioning of the interior of the vehicle by starting an internal combustion engine according to a remote control signal sent from a remote controller. The control apparatus may comprise a controller including at least one processor,
the controller being configured to execute the processing of;
when starting pre-air conditioning according to the remote control signal, setting the control mode of the vehicle to a drive-disabling mode, which is a control mode that disables an operation for driving the vehicle; and
if a specific mode-cancelling operation is detected in a situation in which the remote controller is present in the interior of the vehicle while the control mode of the vehicle is being set to the drive-disabling mode, cancelling the drive-disabling mode while leaving the internal combustion engine operating.

Also disclosed herein is a control method applied to a vehicle configured to perform pre-air conditioning of the interior of the vehicle by starting an internal combustion engine according to a remote control signal sent from a remote controller. The control method may comprise the following steps executed by a computer:
when pre-air conditioning is started according to the remote control signal, setting the control mode of the vehicle to a drive-disabling mode, which is a control mode that disables an operation for driving the vehicle; and
if a specific mode-cancelling operation is detected in a situation in which the remote controller is present in the interior of the vehicle while the control mode of the vehicle is being set to the drive-disabling mode, cancelling the drive-disabling mode while leaving the internal combustion engine operating.

Also disclosed herein is a control system for a vehicle that performs pre-air conditioning of the interior of the vehicle by remote control utilizing exhaust heat during the operation of an internal combustion engine. The control system may comprise:
a remote controller used by a user of the vehicle configured to send a remote control signal for causing pre-air conditioning of the interior of the vehicle to be performed, when it receives a request for performing pre-air conditioning of the interior of the vehicle; and
a control apparatus that performs pre-air conditioning of the interior of the vehicle by starting an internal combustion engine, when it receives the remote control signal sent from the remote controller.
The control apparatus may comprise a controller including at least one processor,
the controller being configured to execute the processing of:
when starting pre-air conditioning according to the remote control signal, setting the control mode of the vehicle to a drive-disabling mode, which is a control mode that disables an operation for driving the vehicle; and
if a specific mode-cancelling operation is detected in a situation in which the remote controller is present in the interior of the vehicle while the control mode of the vehicle is being set to the drive-disabling mode, cancelling the drive-disabling mode while leaving the internal combustion engine operating.

Also disclosed herein is an information processing program configured to cause a computer to implement the above-described method for controlling a vehicle and a non-transitory storage medium in which this program is stored in a computer-readable manner.

This disclosure provides a technology that can strike good balance between convenience for users and security of vehicles.

BRIEF DESCRIPTION OF DRAWINGS

FIG. 1 is a diagram illustrating the general configuration of a vehicle control system according to an embodiment.

FIG. 2 is a diagram illustrating an exemplary configuration of an air conditioning apparatus.

FIG. 3 is a diagram illustrating exemplary hardware configurations of a remoter controller and an ECU.

FIG. 4 is a block diagram illustrating the functional configuration of the ECU.

FIG. 5 is a block diagram illustrating the functional configuration of the remote controller.

FIG. 6 is a flow chart of a process executed by the ECU, which is triggered by the start of pre-air conditioning.

DESCRIPTION OF EMBODIMENTS

In the following, a vehicle control system to which the control apparatus for a vehicle according to this disclosure is applied will be described as an illustrative embodiment. The vehicle control system of this embodiment is a system that performs pre-air conditioning of the interior of a vehicle by remote control by utilizing exhaust heat generated by the operation of an internal combustion engine or using a compressor operated by the internal combustion engine by remote control. The term "pre-air conditioning" used herein refers to heating or cooling the interior of a vehicle beforehand before the vehicle is started (for example, before the user get in the vehicle or the user starts to drive the vehicle). The vehicle to which such a control system is applied may be either a vehicle whose motor is an internal combustion engine or a vehicle whose motor is an hybrid system of an internal combustion engine and an electric motor.

The vehicle control system of this embodiment includes a remote controller used by a user. The remote controller is configured to receive a request for pre-air conditioning made by the user. When the remote controller receives a request for pre-air conditioning, it sends a remote control signal to the vehicle control apparatus. The remote control signal is a signal containing a request for performing pre-air conditioning of the interior of the vehicle. The remote control signal may also contain information about a target temperature in the interior of the vehicle and/or an expected time to start the vehicle.

When the vehicle control apparatus receives the remote control signal, a controller thereof starts the internal combustion engine to start pre-air conditioning. Thus, it is possible to adjust the interior temperature of the vehicle to an appropriate temperature before the user gets in the vehicle or before the user starts to drive the vehicle.

If an operation that suggests someone's getting in the vehicle (e.g. unlocking or opening of the door) is detected after the pre-air conditioning is started, the operation of the internal combustion engine may be stopped automatically. This can prevent an unauthorized person of the vehicle from maliciously driving the vehicle. However, the operation of the internal combustion engine will also be stopped automatically even in the case where the user of the vehicle gets in the vehicle after the start of pre-air conditioning. In order for the user of the vehicle to start the vehicle after the start of pre-air conditioning, it is necessary for the user to conduct the operation of restarting the internal combustion engine. This can deteriorate the convenience of the user of the vehicle. If the operation of the internal combustion engine continues after the detection of an operation that suggests someone's getting in the vehicle, on the other hand, there is a possibility that the vehicle is driven maliciously by an unauthorized person. This can deteriorate the security of the vehicle.

In the system disclosed herein, when pre-air conditioning is started, the controller sets the control mode of the vehicle to a drive-disabling mode. The drive disabling mode is a control mode that disables operations for driving the vehicle. The driving operations disabled by this drive-disabling mode include operations for starting the driving of the vehicle. Examples of such driving operations include steering operation, shift operation, and operation of the accelerator. The driving operations disabled by the drive-disabling mode are not limited to the above example, but they may also include, for example, the operation of releasing the parking brake. Setting the control mode of the vehicle to the drive-disabling mode when starting pre-air conditioning can prevent an unauthorized person from driving the vehicle maliciously. This can improve the security of the vehicle.

If a specific mode-cancelling operation is detected in a situation in which the remote controller is present in the interior of the vehicle while the control mode of the vehicle is being set to the drive-disabling mode (in other words, when pre-air conditioning is being performed), the controller cancels the drive-disabling mode while leaving the internal combustion engine operating. In other words, the controller cancels the drive-disabling mode while leaving the internal combustion engine operating, if the condition that the remote controller is present in the interior of the vehicle and the condition that the specific mode-cancelling operation is detected are both met. The specific mode-cancelling operation may be, for example, an operation other than the operations that are performed when starting the vehicle. It is preferred that the specific mode-cancelling operation be a combination of two or more operations. The specific mode-cancelling operation may be operation of the brake or a combination of operation of the brake and operation of a button or the like for starting the internal combustion engine. Thus, if the user of the vehicle having the remote controller gets in the vehicle and performs the specific mode-cancelling operation, the drive-disabling mode is cancelled with the internal combustion engine being left operating. Consequently, the user need not conduct the operation of restarting the internal combustion engine when causing the vehicle to start to run after pre-air conditioning is started.

The reason why the above two conditions are required to cancel the drive-disabling mode while leaving the internal combustion engine operating is to prevent the vehicle from being caused to run inadvertently by an unintentional operation by, for example, a member of the user's family as well as to prevent malicious driving of the vehicle by someone. For example, if the drive-disabling mode is cancelled with the internal combustion engine left operating only on condition that the specific mode-cancelling operation is detected, the vehicle can be driven maliciously by someone who knows the specific mode-cancelling operation and gets in the vehicle without having the remote controller. If the drive-disabling mode is cancelled with the internal combustion engine left operating only on condition that the remote controller is present in the interior of the vehicle, the vehicle can be caused to run inadvertently by an unintentional operation by, for example, a member of the user's family who gets in the vehicle with the remote controller. If the drive-disabling mode is cancelled with the internal combustion engine left operating on condition that both the aforementioned conditions are met, the above undesirable situations are prevented from occurring without deterioration of the user's convenience.

To further improve the security of the vehicle, the specific mode-cancelling operation may be set as an operation that the person other than the user cannot find easily. For example, the mode-cancelling operation may be a combination of two or more operations that are set arbitrarily by the user or the operation of entering a password that is set arbitrarily by the user to a terminal of the vehicle.

The vehicle control apparatus as above can strike good balance between the user's convenience and the security of the vehicle.

When an operation (forbidden operation) other than the specific mode-cancelling operation is detected while the control mode of the vehicle is being set to the drive-disabling mode (in other words, while the pre-air conditioning is being performed), the controller may automatically stop the operation of the internal combustion engine. The forbidden operation may include operations for starting the vehicle, such as steering operation, shift operation, and operation of the accelerator. Automatically stopping the operation of the internal combustion engine upon detection of such a forbidden operation can prevent the vehicle from being started in a manner undesirable for the user by a malicious operation by an unauthorized person or an unintentional operation by, for example, a member of the user's family with improved reliability.

When the specific mode-cancelling operation is detected in a situation in which the remote controller is not present in the interior of the vehicle while the control mode of the vehicle is being set to the drive-disabling mode (in other words, while the pre-air conditioning is being performed), the controller may automatically stop the operation of the internal combustion engine. This can prevent the vehicle from being driven maliciously by an unauthorized person who may know the specific mode-cancelling operation with improved reliability.

When the operation of the internal combustion engine is stopped automatically for some reason as described above, the controller may send a signal for informing the user of the automatic stoppage of the operation of the internal combustion engine to the remote controller. Thus, the user of the vehicle can know that there is a possibility that a malicious operation of the vehicle may have been performed on the vehicle by an unauthorized person or an operation of the vehicle may have been performed inadvertently by, for example, a member of the user's family. Consequently, the user can go to the place where the vehicle is parked to check the situation of the vehicle.

When the operation of the internal combustion engine is automatically stopped, the controller may set the control mode of the vehicle to a safe mode that disables the operation of restarting the internal combustion engine. This can prevent an unauthorized person from maliciously restarting the operation of the internal combustion engine.

It is preferred that the user can cancel the safe mode when, for example, it is verified that the cause for the automatic stoppage of the operation of the internal combustion engine is an unintentional operation by, for example, a member of the user's family, in other words, when it is verified that no malicious operation by an unauthorized person has been performed. In this connection, the controller may be configured to cancel the safe mode when a certain mode-cancelling operation is performed in a situation in which the remote controller is present in the interior of the vehicle while the control mode of the vehicle is being se to the safe mode. In other words, the safe mode may be cancelled when the user having the remote controller gets in the vehicle and performs this mode-cancelling operation. This mode-cancelling operation performed in this case may be either the operation same as or an operation different from the specific mode-cancelling operation for cancelling the drive-disabling mode. The above feature can improve the security of the vehicle while keeping the user's convenience.

The aforementioned drive-disabling mode may include a first drive-disabling mode that disables operations for opening a door of the vehicle and operations for driving the vehicle and a second drive-disabling mode that disables operations for driving the vehicle while allowing operations for opening a door of the vehicle. During the period from the start of pre-air conditioning until an authentic operation of unlocking the door is detected, the controller may set the control mode of the vehicle to the first drive-disabling mode. The aforementioned authentic operation of unlocking the door may be, for example, the operation of unlocking the door using a remote controller associated with the vehicle or the operation of unlocking the door using a physical key associated with the vehicle. This mode setting will prevent an unauthorized person from maliciously getting in the vehicle as well as from maliciously driving the vehicle. The forbidden operations during the period in which the first drive-disabling mode is being set may include operations for opening a door of the vehicle as well as operations for starting the vehicle, such as steering operation, shift operation, and operation of the accelerator. Thus, the controller can automatically stop the operation of the internal combustion engine not only when a malicious driving operation by an unauthorized person is detected but also when a malicious operation for opening a door by an unauthorized person is detected.

After an authentic operation of unlocking the door is detected, the controller may set the control mode of the vehicle to the second drive-disabling mode. In other words, when an authentic operation of unlocking the door is detected, the controller may switch the control mode of the vehicle from the first drive-disabling mode to the second drive-disabling mode. Thus, after an authentic operation of unlocking the door is performed, the user of the vehicle can open a door of the vehicle and get in the vehicle or open a door of the vehicle and load luggage into the vehicle. Even after an authentic operation of unlocking the door is performed, the vehicle is prevented from being caused to run by a malicious or unauthorized operation by an unauthorized person or started inadvertently by an unintentional operation by, for example, a member of the user's family. The forbidden operations during the time when the second drive-disabling mode is being set may include operations for starting the vehicle, such as steering operation, shift operation, and operation of the accelerator, and operations for opening a door of the vehicle may be excluded from the forbidden operations. Thus, if the user of the vehicle, a member of his/her family or a like person conducts an operation for opening a door, the operation of the internal combustion engine will not be stopped automatically. On the other hand, if a malicious driving operation is performed by an unauthorized person of the vehicle or a driving operation is performed inadvertently by, for example, a member of the user's family, the operation of the internal combustion engine will be stopped automatically.

Embodiment

A more specific embodiment of the above-described vehicle control system will be described in the following with reference to the drawings.

(General System Configuration)

FIG. 1 is a diagram illustrating the general configuration of a vehicle control system according to an embodiment. As illustrated in FIG. 1, this vehicle control system includes a vehicle 1 and a remote controller 200. The vehicle 1 in this embodiment is driven by an internal combustion engine 10 as the motor. The vehicle 1 is equipped with an air conditioner 15 for performing air conditioning of the interior of the vehicle. The remote controller 200 is a device used by the user of the vehicle 1 to remotely control unlocking of the vehicle 1 and air conditioning of the interior of the vehicle. With this control system, the user can start air conditioning (or pre-air conditioning) in the interior of the vehicle by the air conditioner 15 by operating the remote controller 200 before he or she gets in the vehicle 1. Thus, it is possible to adjust the temperature in the interior of the vehicle to a comfortable temperature in a period before the user gets in the vehicle 1.

(Configuration of Vehicle 1)

The configuration of the vehicle 1 according to this embodiment will now be described specifically. As illustrated in FIG. 1, the vehicle 1 is provided with the internal combustion engine 10 as its motor. The internal combustion engine 10 is a spark-ignition internal combustion engine (or gasoline engine) having at least one cylinder or a compression-ignition internal combustion engine (diesel engine). The internal combustion engine 10 rotates the drive wheels 54 via a transmission 12 etc. Alternatively, the motor of the vehicle 1 may be a hybrid system of an internal combustion engine and an electric motor.

The vehicle 1 is provided with a steering actuator 11, the transmission 12, a brake actuator 13, a door lock actuator 14, and the air conditioner 15. The steering actuator 11 is an actuator that changes the steering angle of the steering wheels. The transmission 12 is an apparatus that increases and decreases the rotation speed of the output shaft (or crankshaft) of the internal combustion engine 10 and reverses the direction of rotation of the output shaft of the transmission 12 to the direction reverse to the direction of rotation of the crankshaft. The brake actuator 13 is an actuator that changes the braking force acting on the vehicle 1. The door lock actuator 14 is an actuator that locks and unlocks the doors of the vehicle 1 such as the room doors that are opened and closed on the occasions of persons' getting in and getting out of the interior room of the vehicle and the trunk door that is opened and closed on the occasion of loading and unloading luggage into and out of the trunk of the vehicle. The air conditioner 15 in the system of this embodiment is an apparatus that heats the interior of the vehicle utilizing exhaust heat discharged from the internal combustion engine 10 while it is operating.

As illustrated in FIG. 2, the air conditioner 15 includes, for example, a heat exchanger 15A and an on-off valve 15B. The heat exchanger 15A causes heat exchange between the cooling water circulating in the internal combustion engine 10 and the air for heating. The heat exchanger 15A used in this embodiment transfers heat from the cooling water that has absorbed heat discharged from the internal combustion engine 10 to the air for heating. The on-off valve 15B shuts off and conducts the flow of the cooling water from the internal combustion engine 10 to the heat exchanger 15A. The on-off valve 15 is opened when heating by the air conditioner 15 is needed and closed when heating by the air conditioner 15 is not needed.

The air conditioner 15 may further have the function of cooling the interior of the vehicle. In that case, the air conditioner 15 may further include a compressor that compresses coolant using the output power of the internal combustion engine 10, a condenser that cools the coolant compressed by the compressor, a receiver drier that temporarily stores the coolant cooled by the condenser, an expansion valve that atomizes the coolant, and an evaporator that performs heat exchange between the coolant and the air for cooling.

The vehicle 1 configured as above is provided with an ECU (Electronic Control Unit) 30 that controls devices provided on the vehicle 1. The ECU 30 controls the devices provided on the vehicle 1 on the basis of driving operations by the user, sensor signals output by various sensors provided on the vehicle 1, and remote control signals sent from the remote controller 200. The sensors connected with the ECU 30 include a brake sensor 20, an accelerator sensor 21, a steering sensor 22, a shift sensor 23, a start button 24, and a door knob sensor 25. The brake sensor 20 senses the amount of operation (or the amount of depression) of the brake pedal. The accelerator sensor 21 senses the amount of operation (or the amount of depression) of the accelerator pedal. The steering sensor 23 senses the amount of operation of the steering wheel (i.e. the steering angle) and/or the steering torque. The shift sensor 23 senses the position of the shift lever. The start button 24 is a button that is operated by the user when turning on or off the accessory power of the vehicle 1 and starting or stopping the internal combustion engine 10. The door knob sensor 25 senses operation of the door knob (or door handle) provided on the outer side of each door of the vehicle 1.

The ECU 30 controls the brake actuator 13 on the basis of sensor signals output from the brake sensor 20. The ECU 30 also controls the intake air quantity and the fuel injection quantity of the internal combustion engine 10 on the basis of sensor signals output from the accelerator sensor 21. The ECU 30 also controls the steering actuator 11 on the basis of sensor signals output from the steering sensor 22. The ECU 30 also controls the transmission 12 on the basis of sensor signals output from the shift sensor 23. The ECU 30 also controls the door lock actuator 14 on the basis of remote control signals containing a request for locking or unlocking sent from the remote controller 200. The ECU 30 also controls the air conditioner 15 in response to operations of an operation panel for air conditioning provided in the interior of the vehicle or remote control signals containing a request for pre-air conditioning sent from the remote controller 200.

The ECU 30 may be composed of either one or a plurality of electronic control units. For example, the ECU 30 may include an ECU for controlling the internal combustion engine 10, an ECU for controlling the steering actuator 11, an ECU for controlling the transmission 12, an ECU for controlling the brake actuator 13, an ECU for controlling the door lock actuator 14, an ECU for controlling the air conditioner 15, and an ECU for processing signals transmitted and received between the remote controller 200 and the vehicle 1. These ECUs may be interconnected by an in-vehicle network, such as controller area network (CAN).

(Hardware Configurations of ECU and Remote Controller)

The hardware configurations of the ECU 30 and the remote controller 200 will be described in the following with reference to FIG. 3.

The ECU 30 is a microcomputer that controls various devices provided in the vehicle 1. The ECU 30 has a processor 301, a main storage unit 302, an auxiliary storage unit 303, and a communication unit 304. These components are interconnected by buses. The main storage unit 302 and the auxiliary storage unit 303 are computer-readable recording media. The hardware configuration of the ECU 30 is not limited to the configuration illustrated in FIG. 3, but some components may be eliminated, replaced by other components, or added. The processor 301 of the ECU 30 loads programs stored in a recording medium into a workspace of the main storage unit 302 and executes the programs to control various functional components. Thus, the ECU 30 implements functions for achieving desired purposes.

The processor 301 may be, for example, a CPU (Central Processing Unit) or a DSP (Digital Signal Processor). The processor 301 controls the ECU 30 and executes computation of various information processing. The main storage unit 302 is, for example, a RAM (Random Access Memory) and a ROM (Read Only Memory). The auxiliary storage unit 303 is, for example, an EPROM (Erasable Programmable ROM) or a hard disk drive (HDD). The auxiliary storage unit 303 may include a removable medium, in other words, a portable recording medium. Examples of the removable medium include an USB (Universal Serial Bus) memory, a CD (Compact Disc) and a DVD (Digital Versatile Disc).

What is stored in the auxiliary storage unit 303 includes various programs, various data, and various tables, which can be written into and read out from the auxiliary storage unit 103 when necessary. The programs stored in the auxiliary storage unit 303 includes an operating system (OS). All or a portion of the aforementioned information or data stored in the auxiliary storage unit 303 may be stored in the main storage unit 302 instead. Likewise, information or data stored in the main storage unit 302 may be stored in the auxiliary storage unit 303 instead.

The communication unit 304 performs transmission and reception of information between the ECU 30 and external apparatuses. The communication unit 304 is, for example, a wireless communication circuit for wireless communication. The wireless communication circuit performs data communication based on Bluetooth LowEnergy (BLE) with the remote controller 200. The wireless communication circuit may be configured to perform wireless communication with the remote controller 200 using NFC (Near Field Communication), UWB (Ultra-Wideband) or Wi-Fi (registered trademark). The wireless communication circuit may be configured to be connected to a network using a mobile communication service, such as a 5G (5th Generation) mobile communication service or an LTE (Long Term Evolution) mobile communication service. The network may be, for example, a WAN (Wide Area Network), which is a global public communication network, such as the Internet, a telephone communication network, such as a cellar phone communication network, or other communication network. The communication unit 304 may be provided with a circuit that receives radio frequency (RF) radio waves from the remote controller 200. The communication unit 304 may also be provided with a circuit that transmits low frequency (LF) radio waves for searching for the remote controller present in the interior space of the vehicle.

Various processes executed by the ECU 30 configured as above may be executed either by hardware or software.

The remote controller 200 is a small computer used to remotely control locking and unlocking of the doors of the vehicle 1 and the operation of the air conditioner 15, as described above. The computer serving as the remote controller 200 is a small computer that the user can carry, examples of which include an electronic smart key (portable device), a smartphone, a cellular phone, a tablet terminal, a personal information terminal, and a wearable computer (e.g. smartwatch). The remote controller 200 may be a personal computer (PC) that is connected to the ECU 30 via a network, such as a public communication network (e.g. the Internet).

The remote controller 200 has a processor 201, a main storage unit 202, an auxiliary storage unit 203, a display unit 204, an input unit 205, and a communication unit 206. The processor 201, the main storage unit 202, and the auxiliary storage unit 203 are similar to the processor 301, the main storage unit 302, and the auxiliary storage unit 303 of the ECU 30 and will not be described further. The display unit 204 is, for example, a liquid crystal display (LCD) panel or an electroluminescence (EL) panel. The input unit 205 may include, for example, a touch panel or push buttons through which characters, such as letters, can be input, a microphone through which voices can be input, and a camera that can capture moving images or still images. The communication unit 206 is a communication circuit capable of accessing the network using, for example, a mobile communication service to perform data communication with the ECU 30. The communication unit 206 may be configured to perform communication with the ECU 30 on the basis of the near field communication standard same as one used by the communication unit 304 of the ECU 30. The communication unit 206 may be provided with a circuit capable of transmitting RF radio waves to the ECU 30 of the vehicle 1 and a circuit capable of receiving LF polling radio waves.

Various processes executed by the remote controller 200 configured as above may be executed either by hardware or software.

(Functional Configuration of ECU)

The functional configuration of the ECU 30 will be described next with reference to FIG. 4. As illustrated in FIG. 4, the ECU 30 includes, as functional components, a remote control signal processing part F310, a locking and unlocking processing part F320, a pre-air conditioning processing part F330, and a mode processing part F340. The ECU 30 implements the remote control signal processing part F310, the locking and unlocking processing part F320, the pre-air conditioning processing part F330, and the mode processing part F340 by executing computer programs on the main storage unit 302 by the processor 301. One or some of the remote control signal processing part F310, the locking and unlocking processing part F320, the pre-air conditioning processing part F330, and the mode processing part F340 may be implemented entirely or partly by a hardware circuit(s).

When the communication unit 304 of the remote control signal processing part F310 receives a remote control signal sent from the remote controller 200, the remote control signal processing part F310 executes a process of authenticating (or checking the authenticity of) the remote controller 200. For example, the identity of authentication information contained in the remote control signal and authentication information stored in the main storage unit 302 or the auxiliary storage unit 303 is checked. If they are identical, it is determined that the authentication is successful. On the other hand, if they are not identical, it is determined that the authentication is unsuccessful. The method employed in this authentication process is not limited to the above method. For example, a method using an asymmetric cipher may be employed alternatively.

In the case where it is determined in the above authentication process that the authentication is successful, if the remote control signal is a signal containing a request for unlocking or a request for locking (which will also be referred to as "unlocking request signal" or "locking request signal" respectively), the remote control signal processing part F310 passes the request for unlocking or the request for locking to the locking and unlocking processing part F320. If pre-air conditioning is being performed at the time when the ECU 30 receives the unlocking signal, the remote control signal processing part F310 informs the mode processing part F340 of the result of authentication in the above authentication process. In the case where it is determined in the above authentication process that the authentication is successful, if the remote control signal is a signal containing a request for pre-air conditioning (which will be also referred to as "pre-air conditioning request signal"), the remote control signal processing part F310 passes the request for pre-air conditioning to the pre-air conditioning processing part F330.

The locking and unlocking processing part F320 controls the door actuator 14 according to the unlocking request signal or the locking request signal passed from the remote control signal processing part F310. For example, if the request passed from the remote control signal processing part F310 to the locking and unlocking processing part F320 is the request for unlocking, the locking and unlocking processing part F320 sends a command for unlocking to the door lock actuator 14. If the request passed from the remote control signal processing part F310 to the locking and unlocking processing part F320 is the request for locking, the locking and unlocking processing part F320 sends a command for locking to the door lock actuator 14. The command for unlocking and the command for locking are sent from the ECU 30 to the door lock actuator 14 through the in-vehicle network, such as CAN.

The pre-air conditioning part F330 controls the internal combustion engine 10 and the air conditioner 15 according to the request for pre-air conditioning passed from the remote control signal processing part F310. For example, the pre-air conditioning processing part F330 firstly executes a process for starting the internal combustion engine 10. In this process, the pre-air conditioning processing part F330 executes the processing of actuating a starter motor, the processing of actuating the fuel injection valve, and the processing of actuating the ignition plug. After the internal combustion engine 10 is started, the pre-air conditioning processing part F330 actuates the air-conditioner 15 to start pre-air conditioning. Specifically, the pre-air conditioning processing part F330 causes the on-off valve 15B to open. This causes heat exchange between the cooling water that has absorbed heat discharged from the internal combustion engine 10 and the air for heating in the heat exchanger 15A, so that the air for heating is heated. Consequently, the interior of the vehicle can be heated to an appropriate temperature, before the user gets in the vehicle 1. When the pre-air conditioning processing part F330 starts to perform pre-air conditioning, the pre-air conditioning processing part F330 notifies the mode processing part F340 of the start of pre-air conditioning. Commands sent from the pre-air conditioning processing part F330 to the internal combustion engine 10 and the air conditioner 15 are transmitted through the in-vehicle network, such as CAN.

If information designating an expected time to start the vehicle 1 is contained in the request for pre-air conditioning, the pre-air conditioning processing part F330 may start the internal combustion engine 10 and start pre-air conditioning by the air conditioner 15 at a time earlier than the expected time to start the vehicle by a certain length of time. This length of time may be a fixed length of time or a time varied according to the ambient temperature and/or the target temperature in the interior of the vehicle.

The mode processing part F340 sets and changes the control mode of the vehicle 1. For example, when the mode processing part F340 receives a notification of the start of pre-air conditioning from the pre-air conditioning processing part F330, the mode processing part F340 sets the control mode of the vehicle 1 to the drive-disabling mode. The drive-disabling mode is a mode that disables specific operations performed on the vehicle 1. The drive-disabling mode according to this embodiment includes a first drive-disabling mode and a second drive-disabling mode. The first drive-disabling mode is a mode that disables operations for opening a door of the vehicle 1 and operations for driving the vehicle 1, such as steering operation, shift operation, and operation of the accelerator. The second drive-disabling mode is a mode that disables operations for driving the vehicle 1, such as steering operation, shift operation, and operation of the accelerator while allowing operations for opening a door of the vehicle 1.

The first drive-disabling mode is set when pre-air conditioning is started by the pre-air conditioning processing part F330, in other words when the mode processing part F340 receives a notification of the start of pre-air conditioning. While the first drive-disabling mode is being set, the operations for opening a door and the driving operations by an unauthorized person who does not have the remote controller 200 associated with the vehicle 1 are disabled. In consequence, a malicious or unauthentic operation is prevented from being performed by an unauthorized person while pre-air conditioning is being performed, even if the user of the vehicle 1 is away from the vehicle 1.

If a forbidden operation is detected while the first drive-disabling mode is being set, the mode processing part F340 may automatically stop the operation of the internal combustion engine 10. The forbidden operations include operations for opening a door and operations for starting the vehicle 1 (such as steering operation, shift operation, and operation of the accelerator). Then, the mode processing part F340 may switch the control mode of the vehicle 1 from the first drive-disabling mode to a safe mode. The safe mode is a mode that disables operations for restarting the internal combustion engine 10 (e.g. operation of the start button 24). Then, even if an unauthorized person can maliciously open a door of the vehicle 1, he or she is prevented from restarting the internal combustion engine 10. Therefore, the vehicle 1 is prevented from being driven maliciously with improved reliability.

When an authentic unlocking operation is detected while the first drive-disabling mode is being set, the mode processing part F340 switches the control mode of the vehicle 1 from the first drive-disabling mode to the second drive-disabling mode. The authentic unlocking operation refers to, for example, an unlocking operation performed using the remote controller 200 associated with the vehicle 1 or an unlocking operation performed using a physical key associated with the vehicle 1. When the user of the vehicle 1 performs the unlocking operation using the remote controller 200, an unlocking request signal is sent from the remote controller 200 to the ECU 30. Then, the authentication process is performed by the remote control signal processing part F310, as described above. If it is determined in the authentication process that the authentication is successful, the locking and unlocking processing part F320 sends an unlocking command to the door lock actuator 14, so that the door is unlocked. As described above, the result of authentication in the authentication process is passed from the remote control signal processing part F310 to the mode processing part F340. If the result of authentication is successful, the mode processing part F340 switches the control mode of the vehicle 1 from the first drive-disabling mode to the second drive-disabling mode. On the other hand, if the result of authentication is unsuccessful, unlocking of the door by the locking and unlocking processing part F320 is not performed, and the setting of the first drive-disabling mode is continued by the mode processing part F340.

After the first drive-disabling mode is switched to the second drive-disabling mode, the user of the vehicle 1 is allowed to open the doors. In consequence, the user can open a door and get in the vehicle or open a door and load luggage into the vehicle 1. Since operations for driving the vehicle 1 are disabled, the vehicle 1 is prevented from being started by a malicious operation by an unauthorized person or an inadvertent operation by, for example, a member of the user's family, even if the user leaves the vehicle 1 with the doors being unlocked.

If a forbidden operation is detected while the second drive-disabling mode is being set, the mode processing part F340 may automatically stop the operation of the internal combustion engine 10. The forbidden operations in this case include operations for starting the vehicle 1 but do not include operations for opening a door of the vehicle 1. The mode processing part F340 may switch the control mode of the vehicle 1 from the second drive-disabling mode to the safe mode. Then, opening of a door of the vehicle 1 by its user does not cause an unnecessary stoppage of the operation of the internal combustion engine 10. If a forbidden operation is performed maliciously by an unauthorized person or inadvertently by, for example, a member of the user's family, the operation of the internal combustion engine 10 is stopped automatically.

Moreover, in the case where a forbidden operation is performed maliciously by an unauthorized person, the internal combustion engine 10 is prevented from being restarted by that person. Therefore, the vehicle 1 is prevented more reliably from being started maliciously by an unauthorized person or inadvertently by, for example, a member of the user's family after the doors of the vehicle 1 are unlocked by an authentic unlocking operation.

When the operation of the internal combustion engine 10 is stopped automatically while the first or second drive-disabling mode is being set, the mode processing part F340 may send a signal for informing the user of the vehicle 1 of this fact to the remote controller 200 (which will also be referred to as "stoppage informing signal"). Thus, the user of the vehicle 1 can know that a malicious operation or an inadvertent operation is performed on the vehicle 1 during pre-air conditioning. Consequently, the user of the vehicle 1 can go to the place where the vehicle 1 is parked to check the situation of the vehicle 1.

While the second drive-disabling mode is being set, if a specific mode-cancelling operation is performed in situation in which the remote controller 200 associated with the vehicle 1 is present in the interior of the vehicle 1, the mode processing part F340 cancels the second drive-disabling mode while leaving the internal combustion engine 10 operating. After the second drive-disabling mode is cancelled, operations for driving the vehicle 1 are allowed so long as the remote controller 200 is present in the interior of the vehicle. In consequence, the user of the vehicle 1 can start the vehicle 1 without need to restart the internal combustion engine 10.

The specific mode-cancelling operation may be, for example, operating the start button 24 while operating the brake pedal. Such a specific mode-cancelling operation is detected based on sensor signals output from the brake sensor 20 and the start button 24. Specifically, if operation of the start button 24 is detected at the same time when operation of the brake pedal is detected by the brake sensor 20, it is determined that the specific mode-cancelling operation is performed.

A determination as to whether the remote controller 200 associated with the vehicle 1 is present or not is made by the following process. The mode processing part F340 firstly performs polling with LF radio waves to obtain authentication information of a remote controller present in the interior of the vehicle. If there is no remote controller in the interior of the vehicle 1, authentication information cannot be obtained. Then, the mode processing part F340 determines that the remote controller 200 associated with the vehicle 1 is not present in the interior of the vehicle 1. If a remote controller 200 is present in the interior of the vehicle 1, the mode processing part F340 performs an authentication process for the authentication information obtained by the aforementioned polling. This authentication process is performed in the same manner as the authentication process performed by the remote control signal processing part F310. If it is determined by the authentication process that the authentication is unsuccessful, the mode processing part F340 determines that the remote controller 200 associated with the vehicle 1 is not present in the interior of the vehicle 1. On the other hand, if it is determined by the authentication process that the authentication is successful, the mode processing part F340 determines that the remote controller 200 associated with the vehicle 1 is present in the interior of the vehicle 1.

If it is determined that the remote controller 200 associated with the vehicle 1 is not present in the interior of the vehicle 1 at the time when the specific mode-cancelling operation is detected, the mode processing part F340 may automatically stop the operation of the internal combustion engine 10. Then, the mode processing part F340 may switch the control mode of the vehicle 1 from the second drive-disabling mode to the safe mode. Then, the vehicle 1 is prevented from being started maliciously or inadvertently, even when an unauthorized person performs the specific mode-cancelling operation maliciously or when a member of the user's family performs the operation same as the specific mode-cancelling operation accidentally.

The specific mode-cancelling operation is not limited to that described above, but it may be changed to meet laws and regulations etc. The specific mode-cancelling operation may be a combination of two or more operations set arbitrarily by the user or the operation of entering a password set arbitrarily by the user to an on-vehicle terminal.

When the control mode of the vehicle 1 is being set to the safe mode, the safe mode may be cancelled on condition that the specific mode-cancelling operation is performed with the remote controller 200 being present in the interior of the vehicle 1. This allows the user to cancel the safe mode in cases where, for example, the operation of the internal combustion engine 10 is stopped automatically due to inadvertent operation performed by a member of the user's family.

The same drive-disabling mode may be set during the period from the time when pre-air conditioning is started until the authentic unlocking operation is performed by the remote controller 200 and the period after the time when the authentic unlocking operation is performed by the remote controller 200. In other words, a drive-disabling mode same as the above-described second drive-disabling mode may be set during these periods. This can prevent, at least, the vehicle 1 from being driven by malicious driving operations.

(Functional Configuration of Remote Controller)

The functional configuration of the remote controller 200 will be described next with reference to FIG. 5. As illustrated in FIG. 5, the remote controller 200 according to this embodiment includes, as its functional components, a request processing part F210 and a communication processing part F220. The remote controller 200 implements the request processing part F210 and the communication processing part F220 by executing computer programs on the main storage unit 202 by the processor 201. The request processing part F210 and/or the communication processing part F220 may be entirely or partly implemented by a hardware circuit(s).

When an operation requesting pre-air conditioning is performed on the remote controller 200, the request processing part F210 generates a remote control signal (or pre-air conditioning request signal) containing the authentication information of the remote controller 200 and a request for pre-air conditioning. When an operation requesting unlocking or locking is performed on the remote controller 200, the request processing part F210 generates a remote control signal (or unlocking request signal or locking request signal) containing the authentication information of the remote controller 200 and a request for unlocking or a request for locking. The remote control signal generated by the request processing part F210 is sent to the communication processing part F220.

The communication processing part F220 sends various signals to the ECU 30 of the vehicle 1 and receives various signals from the ECU 30 of the vehicle 1. For example, when the communication processing part F220 receives a remote control signal generated by the request processing part F210, the communication processing part F220 transmits the remote control signal to the ECU 30 through the communication unit 206. When the communication unit 206 receives the stoppage informing signal from the ECU 30, the communication processing part F220 causes the display unit 204 to display text information or the like to indicate the fact that the internal combustion engine 10 was stopped automatically while pre-air conditioning was being performed. When the communication unit 206 receives polling radio waves from the ECU 30 in the process of searching for the remote controller 200, the communication processing part F220 sends the authentication information of the remote controller 200 to the ECU 30 through the communication unit 206.

(Process Performed by ECU)

A process performed by the ECU 30 in the system according to this embodiment will be described in the following with reference to FIG. 6. FIG. 6 is a flow chart of a process executed by the ECU 30, which is triggered by the start of pre-air conditioning.

As described above, when pre-air conditioning is started by the pre-air conditioning processing part F330, the pre-air conditioning processing part F330 sends a notification of the start of pre-air conditioning to the mode processing part F340. Triggered by reception of the notification of the start of pre-air conditioning, the mode processing part F340 sets the control mode of the vehicle 1 to the first drive-disabling mode (step S101).

While the first drive-disabling mode is being set, the mode processing part F340 monitors signals output from the steering sensor 22, the sift sensor 23, the accelerator sensor 21, and the door knob sensor 25 to determine whether a forbidden operation is detected (step S102). The forbidden operations during the period in which the first drive-disabling mode is being set include operations for driving, such as steering operation, shift operation, and operation of the accelerator and operation for opening a door (e.g. operation of a door knob).

If none of steering operation, shift operation, operation of the accelerator, and operation of a door knob is detected while the first drive-disabling mode is being set (a negative answer in step S102), then it is determined whether the ECU 30 has received an unlocking request signal (step S103).

If the ECU 30 has not received an unlocking request signal (a negative answer in step S103), the processing of steps S102 onward is executed again. On the other hand, if the ECU 30 has received an unlocking request signal (an affirmative answer in step S103), the remote control signal processing part F310 executes the authentication process about the authentication information contained in the unlocking request signal (step S104). The result of the authentication process executed by the remote control signal processing part F310 is sent from the remote control signal processing part F310 to the mode processing part F340.

Then, the mode processing part F340 determines whether or not the result of the authentication process executed by the remote control signal processing part F310 is successful (step S105). If the result of the authentication process executed by the remote control signal processing part F310 is unsuccessful (a negative answer in step S105), it means that the ECU 30 has received an unlocking request signal from a remote controller other than the remote controller 200 associated with the vehicle 1. Then, the processing of step S102 onward is executed again. On the other hand, if the result of the authentication process executed by the remote control signal processing part F310 is successful (an affirmative answer in step S105), the mode processing part F340 switches the control mode of the vehicle 1 from the first drive-disabling mode to the second drive-disabling mode (step S106).

While the second drive-disabling mode is being set, the mode processing part F340 monitors sensor signals output from the steering sensor 22, the shift sensor 23, and the accelerator sensor 21 to determine whether a forbidden operation is detected (step S107). The forbidden operations during the period in which the second drive-disabling mode is being set include steering operation, shift operation, and operation of the accelerator sensor but do not include operation for opening a door (i.e. operation of a door knob).

If none of steering operation, shift operation, and operation of the accelerator is detected while the second drive-disabling mode is being set (a negative answer in step S107), it is determined whether a specific mode-cancelling operation is detected (step S108). The specific mode-cancelling operation is, for example, operating the start button 24 while operating the brake. The mode processing part F340 determines whether the specific mode-cancelling operation is detected by monitoring sensor signals output from the brake sensor 20 and the start button 24.

If operation of the start button 24 is not detected at the same time when operation of the brake pedal is detected by the brake sensor 20, it means that the specific mode-cancelling operation is not performed (a negative answer in step S108). Then, the processing of step S107 onward is executed again. On the other hand, if operation of the start button 24 is detected at the same time when operation of the brake pedal is detected by the brake sensor 20, it means that the specific mode-cancelling operation is performed (a positive answer in step S108). Then, the mode processing part F340 determines whether the remote controller 200 associated with the vehicle 1 is present in the interior of the vehicle 1 (step S109). For example, the mode processing part F340 searches for the remote controller by performing polling using LF radio waves. If authentication information of the remote controller is obtained by this process, the mode processing part F340 performs the authentication process. If it is determined by the authentication process that the authentication is successful, it is determined that the remote controller 200 associated with the vehicle 1 is present in the interior of the vehicle 1 (an affirmative answer in step S109). Then, the mode processing part F340 cancels the setting of the second drive-disabling mode (step S110).

If a forbidden operation is detected while the first drive-disabling mode is being set (an affirmative answer in step S102), if a forbidden operation is detected while the second drive-disabling mode is being set (an affirmative answer in step S107), or if the remote controller 200 is not present in the interior of the vehicle 1 at the time when the specific mode-cancelling operation is detected (a negative answer in step S109), the mode processing part F340 automatically stops the operation of the internal combustion engine 10 (step S111).

When the operation of the internal combustion engine 10 is automatically stopped, the mode processing part F340 sends the stoppage informing signal to the remote controller 200 via the communication unit 304 (step S112). Then, the mode processing part F340 switches the control mode of the vehicle 1 from the first drive-disabling mode or the second drive-disabling mode to the safe mode (step S113). While the safe mode is being set, if the specific mode-cancelling operation is detected with the remote controller 200 associated with the vehicle 1 being present in the interior of the vehicle 1, the safe mode may be cancelled.

There may be cases where the user performs an operation requesting pre-air conditioning using the remote controller 200 after he or she gets in the vehicle 1. In such cases, the user can cancel the drive-disabling mode by performing the specific mode-cancelling operation after performing an authentic door unlocking operation (in other words, after the control mode is switched from the first drive-disabling mode to the second drive-disabling mode). While the first drive-disabling mode is being set also, if the specific mode-cancelling operation is detected in a situation in which the remote controller 200 associated with the vehicle 1 is present in the interior of the vehicle 1, the mode processing part F340 may cancel the first drive-disabling mode. To this end, when step S102 in the flow chart of FIG. 6 is answered in the negative, the processing same as the processing of steps S108 and S109 may be executed. Then, if it is determined that the remote controller 200 associated with the vehicle 1 is present in the interior of the vehicle 1 at the time when the specific mode-cancelling operation is detected, the mode processing part F340 may cancel the first drive-disabling mode.

If the user having the remote controller 200 performs an authentic unlocking operation and gets in the vehicle 1 after the start of pre-air conditioning, the above-described system according to this embodiment allows the user to cancel the drive-disabling mode by performing the specific mode-cancelling operation. Then, the internal combustion engine 10 is left operating, and hence the user can start the vehicle 1 without need to perform the operation of restarting the internal combustion engine 10. During the period from the time when pre-air conditioning is started to the time when an authentic unlocking operation is detected, the operation of driving the vehicle 1 and the operation of opening a door are disabled. Therefore, the system prevents an unauthorized person from maliciously getting in the vehicle 1 or maliciously starting the vehicle 1. After an authentic unlocking operation is detected, the operation of driving the vehicle 1 is disabled. Therefore, the system can prevent an unauthorized person from maliciously starting the vehicle 1 or someone, such as a member of the user's family, from inadvertently starting the vehicle 1. Thus, the system of this embodiment can strike good balance between the convenience of the user and the security of the vehicle 1.

In the case where the system is configured to automatically stop the operation of the internal combustion engine 10 when a forbidden operation is detected while the drive-disabling mode is being set, the system can prevent an unauthorized person from maliciously starting the vehicle 1 with improved reliability. In the case where the system is configured to disable the operation of restarting the internal combustion engine 10 after the operation of the internal combustion engine 10 is stopped automatically, the security of the vehicle 1 is further improved, because the internal combustion engine 10 cannot be restarted maliciously by an unauthorized person.

While a case where the interior of the vehicle is heated by pre-air conditioning has been described with the above embodiment, the control apparatus for a vehicle according to this disclosure can be applied also to cases where the interior of the vehicle is cooled by pre-air conditioning. The control apparatus for a vehicle according to this disclosure can be applied to whatever vehicle system that requires the operation of its internal combustion engine when performing pre-air conditioning.

In terms of preventing a vehicle from being started maliciously by an unauthorized person, the process relating to setting of the drive-disabling mode and the process relating to cancellation of the drive-disabling mode disclosed herein can be applied also to electric vehicles (EV), plug-in hybrid vehicles (PHV), and fuel cell vehicles (FCV). For example, if the process relating to setting of the drive-disabling mode and the process relating to cancellation of the drive-disabling mode disclosed herein are applied to an EV, PHV, or FCV whose driving system is changed into an operable state when pre-air conditioning is started, the vehicle can be prevented from driven maliciously. In this case, if a forbidden operation is detected while the drive-disabling mode is being set, the process of shutting down the driving system of the vehicle may be performed instead of the process of stopping the internal combustion engine. After pre-air conditioning is started, if the user having a remote controller gets in the EV, PHV, or FCV after performing an authentic unlocking operation, the drive-disabling mode may be cancelled by a specific mode-cancelling operation performed by the user. In this case, the driving system may left operable so that the EV, PHV, or FCV can be started without need for the user to perform the operation of restarting the driving system.

<Modification>

While in the above-described case pre-air conditioning is performed based on direct communication between the remote controller and the ECU, communication between the remote controller and the ECU may be performed via a server apparatus. In that case, the process of authenticating the remote controller may be performed by the server apparatus.

<Others>

The above embodiment and modification have been described only by way of example. Modifications can be made to them without departing from the essence of this disclosure. For example, some features of the above-described embodiment and modification may be employed in any possible combination.

The processing and means that have been described in the foregoing may be employed in any combination so long as it is technically feasible to do so. One, some, or all of the processes that have been described as processes performed by one apparatus may be performed by a plurality of apparatuses in a distributed manner. One, some, or all of the processes that have been described as processes performed by different apparatuses may be performed by a single apparatus. For example, one or some of the processes that are performed by the ECU in the above-described embodiment may be performed by the remote controller. The hardware configuration employed to implement various functions in a computer system may be modified flexibly.

The technology disclosed herein can be carried out by supplying a computer program(s) that implements the functions described in the above description of the embodiment to an ECU to cause one or more processors of the ECU to read and execute the program(s). Such a computer program(s) may be supplied to the ECU by a computer-readable, non-transitory storage medium that can be connected to a system bus of the ECU, or through a network. The computer-readable, non-transitory storage medium refers to a recording medium that can store information, such as data and programs, electrically, magnetically, optically, mechanically, or chemically in such a way as to allow the computer or the like to read the stored information. Examples of such a recording medium include any type of disc medium including a magnetic disc, such as a floppy disc (registered trademark) and a hard disk drive (HDD) and an optical disc, such as a CD-ROM, a DVD and a Blu-ray disc, and other recording media, such as a read-only memory (ROM), a random access memory (RAM), an EPROM, an EEPROM, a magnetic card, a flash memory, an optical card, and a solid state drive (SSD).

What is claimed is:

1. A control apparatus for a vehicle applied to a vehicle configured to perform pre-air conditioning of the interior of the vehicle by starting an internal combustion engine according to a remote control signal sent from a remote controller, comprising a controller including at least one processor,
the controller being configured to execute the processing of;
when starting pre-air conditioning according to the remote control signal, setting the control mode of the vehicle to a drive-disabling mode, which is a control mode that disables an operation for driving the vehicle; and
if a specific mode-cancelling operation is detected in a situation in which the remote controller is present in the interior of the vehicle while the control mode of the vehicle is being set to the drive-disabling mode, cancelling the drive-disabling mode while leaving the internal combustion engine operating.

2. A control apparatus for a vehicle according to claim 1, wherein if a forbidden operation different from the specific mode-cancelling operation is detected while the control mode of the vehicle is being set to the drive-disabling mode, the controller automatically stops the operation of the internal combustion engine.

3. A control apparatus for a vehicle according to claim 1, wherein if the specific mode-cancelling operation is detected in a situation in which the remote controller is not present in the interior of the vehicle while the control mode of the vehicle is being set to the drive-disabling mode, the controller automatically stops the operation of the internal combustion engine.

4. A control apparatus for a vehicle according to claim 2, wherein when the operation of the internal combustion engine is stopped automatically, the controller sends a signal for informing a user that the operation of the internal combustion engine is automatically stopped to the remote controller.

5. A control apparatus for a vehicle according to claim 4, wherein when the operation of the internal combustion engine is stopped automatically, the controller sets the control mode of the vehicle to a safe mode, which is a control mode that disables the operation of restarting the internal combustion engine.

6. A control apparatus for a vehicle according to claim 5, wherein if the specific mode-cancelling operation is detected in a situation in which the remote controller is present in the interior of the vehicle while the control mode of the vehicle is being set to the safe mode, the controller cancels the safe mode.

7. A control apparatus for a vehicle according to claim 1, wherein the specific mode-cancelling operation is operating a button for starting the internal combustion engine while operating the brake of the vehicle.

8. A control apparatus for a vehicle according to claim 1, wherein
the drive-disabling mode includes a first drive disabling mode, which disables an operation for opening a door of the vehicle and an operation for driving the vehicle, and a second drive-disabling mode, which disables an operation for driving the vehicle while allowing an operation for opening a door of the vehicle,
in the period from the time when pre-air conditioning of the interior of the vehicle is started to the time when an authentic operation for unlocking a door is detected, the controller sets the control mode of the vehicle to the first drive-disabling mode, and
in the period after the authentic operation for unlocking a door is detected, the controller sets the control mode of the vehicle to the second drive-disabling mode.

9. A control apparatus for a vehicle according to claim 1, wherein the operation for driving the vehicle disabled by the drive-disabling mode includes at least one of steering operation, shift operation, and operation of the accelerator.

10. A control method for a vehicle applied to a vehicle configured to perform pre-air conditioning of the interior of the vehicle by starting an internal combustion engine according to a remote control signal sent from a remote controller, comprising the following steps executed by a computer:
when pre-air conditioning is started according to the remote control signal, setting the control mode of the vehicle to a drive-disabling mode, which is a control mode that disables an operation for driving the vehicle; and
if a specific mode-cancelling operation is detected in a situation in which the remote controller is present in the interior of the vehicle while the control mode of the vehicle is being set to the drive-disabling mode, cancelling the drive-disabling mode while leaving the internal combustion engine operating.

11. A control method for a vehicle according to claim 10, further comprising the step of automatically stopping the operation of the internal combustion engine, if a forbidden operation different from the specific mode-cancelling operation is detected while the control mode of the vehicle is being set to the drive-disabling mode.

12. A control method for a vehicle according to claim 10, further comprising the step of automatically stopping the operation of the internal combustion engine, if the specific mode-cancelling operation is detected in a situation in which the remote controller is not present in the interior of the vehicle while the control mode of the vehicle is being set to the drive-disabling mode.

13. A control method for a vehicle according to claim 11, further comprising the step of sending a signal for informing a user that the operation of the internal combustion engine is automatically stopped to the remote controller, when the operation of the internal combustion engine is stopped automatically.

14. A control method for a vehicle according to claim 13, further comprising the step of setting the control mode of the vehicle to a safe mode, when the operation of the internal combustion engine is stopped automatically, the safe mode being a control mode that disables the operation of restarting the internal combustion engine.

15. A control method for a vehicle according to claim 14, further comprising the step of cancelling the safe mode, if the specific mode-cancelling operation is detected in a situation in which the remote controller is present in the interior of the vehicle while the control mode of the vehicle is being set to the safe mode.

16. A control method for a vehicle according to claim 10, wherein the specific mode-cancelling operation is operating a button for starting the internal combustion engine while operating the brake of the vehicle.

17. A control method for a vehicle according to claim 10, wherein
- the drive-disabling mode includes a first drive disabling mode, which disables an operation for opening a door of the vehicle and an operation for driving the vehicle, and a second drive-disabling mode, which disables an operation for driving the vehicle while allowing an operation for opening a door of the vehicle,
- in the period from the time when pre-air conditioning of the interior of the vehicle is started to the time when an authentic operation for unlocking a door is detected, the control mode of the vehicle is set to the first drive-disabling mode, and
- in the period after the authentic operation for unlocking a door is detected, the control mode of the vehicle is set to the second drive-disabling mode.

18. A control method for a vehicle according to claim 10, wherein the operation for driving the vehicle disabled by the drive-disabling mode includes at least one of steering operation, shift operation, and operation of the accelerator.

19. A control system for a vehicle that performs pre-air conditioning of the interior of the vehicle by remote control utilizing exhaust heat during the operation of an internal combustion engine, comprising:
- a remote controller used by a user of the vehicle configured to send a remote control signal for causing pre-air conditioning of the interior of the vehicle to be performed, when it receives a request for performing pre-air conditioning of the interior of the vehicle; and
- a control apparatus that performs pre-air conditioning of the interior of the vehicle by starting an internal combustion engine, when it receives the remote control signal sent from the remote controller,
- wherein the control apparatus comprises a controller including at least one processor,
- the controller being configured to execute the processing of:
- when starting pre-air conditioning according to the remote control signal, setting the control mode of the vehicle to a drive-disabling mode, which is a control mode that disables an operation for driving the vehicle; and
- if a specific mode-cancelling operation is detected in a situation in which the remote controller is present in the interior of the vehicle while the control mode of the vehicle is being set to the drive-disabling mode, cancelling the drive-disabling mode while leaving the internal combustion engine operating.

20. A control system for a vehicle according to claim 19, wherein if a forbidden operation different from the specific mode-cancelling operation is detected while the control mode of the vehicle is being set to the drive-disabling mode, the controller automatically stops the operation of the internal combustion engine.

* * * * *